(12) United States Patent
Massey

(10) Patent No.: US 6,216,303 B1
(45) Date of Patent: Apr. 17, 2001

(54) DOCK LEVELER HAVING AN IMPROVED SUPPORT LEG MECHANISM

(75) Inventor: Douglas H. Massey, New Berlin, WI (US)

(73) Assignee: Kelley Company, Inc., Mequon, WI (US)

(*) Notice: Subject to any disclaimer, the term of this patent is extended or adjusted under 35 U.S.C. 154(b) by 0 days.

(21) Appl. No.: 09/049,576

(22) Filed: Mar. 27, 1998

(51) Int. Cl.[7] .................................................. E01D 1/00
(52) U.S. Cl. ............................................. 14/71.3; 14/69.5
(58) Field of Search .................................. 14/71.1, 71.7, 14/72.5

(56) References Cited

U.S. PATENT DOCUMENTS

| | | | |
|---|---|---|---|
| 3,368,229 | * | 2/1968 | Pfleger .................................. 14/71.1 |
| 3,835,497 | | 9/1974 | Smith . |
| 3,858,264 | | 1/1975 | Kuhns et al. . |
| 3,877,102 | | 4/1975 | Artzberger . |
| 3,902,213 | | 9/1975 | Pfleger et al. . |
| 3,921,241 | | 11/1975 | Smith . |
| 3,995,342 | | 12/1976 | Wiener . |
| 4,279,050 | | 7/1981 | Abbott . |
| 4,328,602 | | 5/1982 | Bennett . |
| 4,665,579 | * | 5/1987 | Bennett et al. ........................ 14/71.1 |
| 4,937,906 | * | 7/1990 | Alexander ............................. 14/71.1 |
| 4,974,276 | | 12/1990 | Alexander . |
| 5,440,772 | | 8/1995 | Springer et al. . |
| 5,475,888 | * | 12/1995 | Massey ................................. 14/71.1 |
| 5,481,774 | | 1/1996 | Hodges et al. . |
| 5,657,502 | * | 8/1997 | Ellis ..................................... 14/71.1 |

FOREIGN PATENT DOCUMENTS 2048210   4/1980  (GB) .

* cited by examiner

Primary Examiner—David Bagnell
Assistant Examiner—Raymond Addie
(74) Attorney, Agent, or Firm—Michael Best & Friedrich LLP

(57) ABSTRACT

A dock leveler having a ramp, a support leg for supporting the ramp, and an extension lip that is movably connected to the ramp. The support leg is capable of movement relative to the ramp from a supporting position to a retracted position, and the lip is movable to an extended position. Movement of the lip toward the extended position results in movement of the support leg from the retracted position to the supporting position. The dock leveler is operated by raising the ramp above a resting position, retracting the support leg from a supporting position to a retracted position, contacting the lip with a vehicle, extending the lip to an extended position, and moving the support leg from the retracted position to the supporting position during the extending step.

16 Claims, 4 Drawing Sheets

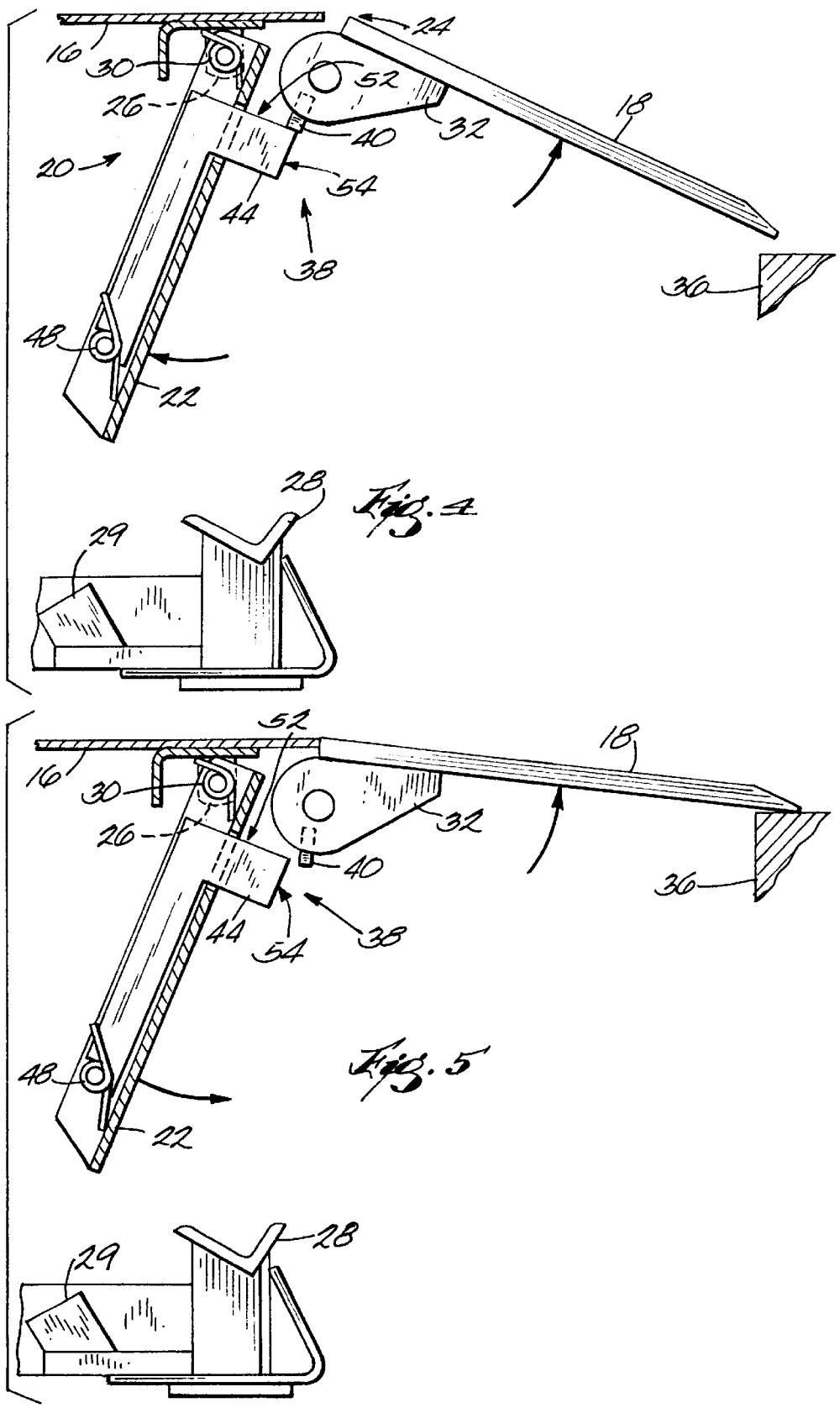

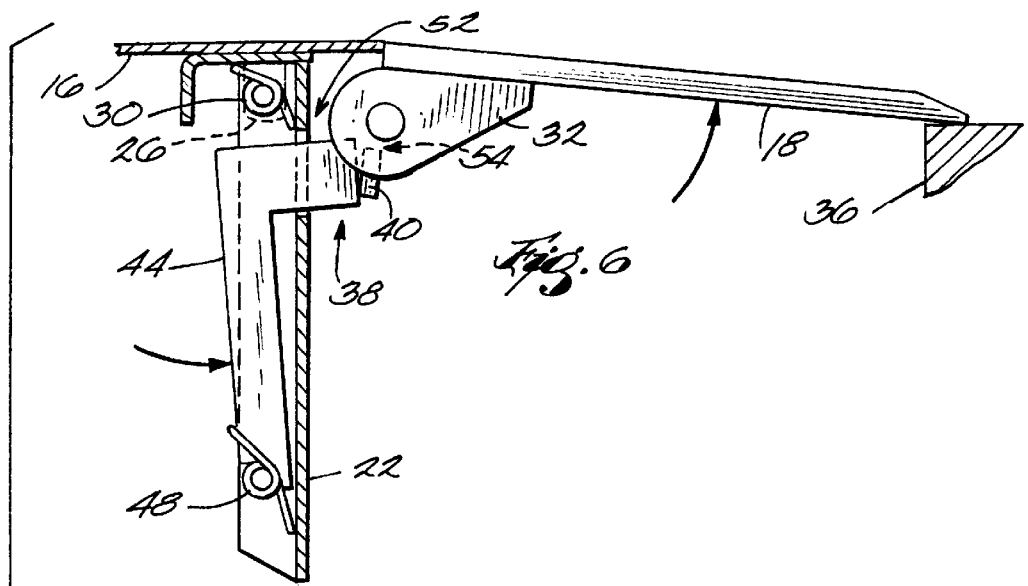
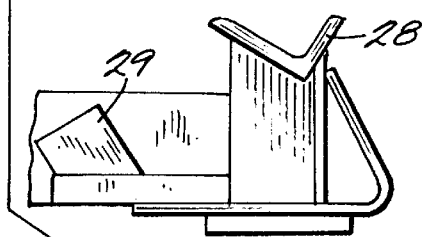
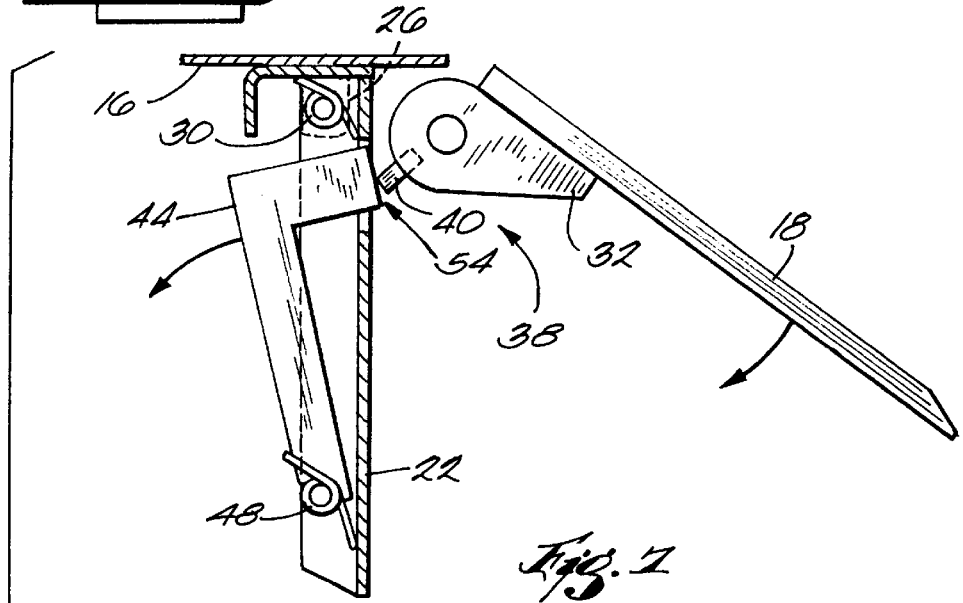
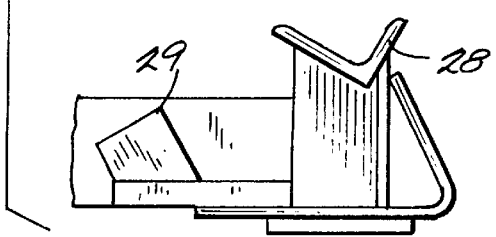

DOCK LEVELER HAVING AN IMPROVED SUPPORT LEG MECHANISM

FIELD OF THE INVENTION

The present invention generally relates to the field of dock levelers, and more particularly to dock levelers having support legs.

BACKGROUND OF THE INVENTION

Dock levelers are mounted on loading docks and are adapted to bridge the gap between the dock and the end of a vehicle (e.g., a truck) parked in front of the dock. The dock leveler enables material handling equipment, such as a fork lift, to move between the dock and the vehicle bed.

The typical dock leveler includes a supporting structure, which is mounted in a pit in the loading dock, and a ramp. The rear end of the ramp is pivotally attached to the supporting structure so that the ramp is movable from a horizontal position to a position within the working range of the ramp (e.g., between an upwardly inclined position and a downwardly declined position). Hinged to the front end of most ramps is an extension lip, which is movable between a downwardly hanging pendent position and an extended position where the lip forms an extension to the ramp. Typically, after a truck is parked in front of the loading dock in preparation for a loading operation, the ramp of the dock leveler is pivoted upwardly to allow the pendent lip to clear the vehicle bed and subsequently lowered. As the ramp is moved, the lip is pivoted outwardly from the pendent position to the extended position. As the ramp is lowered, the extended lip will engage the bed of the truck to provide support to the ramp.

Many dock levelers also include support legs that maintain the ramp in a substantially horizontal position when the ramp is not in use (i.e., when the dock leveler is not engaged with a truck bed). These legs can be retracted for servicing truck beds that are below dock level. Typically, a pair of support legs are pivotally attached to the ramp at or around the lip hinge area and extend downwardly to engage a supporting sub-frame. The support legs may be spring biased forwardly toward a supporting position, and may be retracted to a non-supporting position by one of several means.

Both manual and automatic mechanisms have been used to retract the support legs. Manual support leg retraction mechanisms require the operator to engage a mechanism, for example by pulling a chain, to retract the support legs as the ramp is being lowered. Automatic support leg retraction mechanisms typically retract the support legs as the lip of the dock leveler is extended. In this way, the support leg is always retracted when the lip engages a truck bed.

SUMMARY OF THE INVENTION

The present invention is directed to an improvement in dock levelers. More specifically, the invention relates to a mechanism and a method of controlling the movement of one or more support legs, and incorporates several features and advantages of manual and automatic support leg retraction mechanisms while avoiding some of their respective disadvantages.

One feature of the present invention is that the support legs may be automatically retracted to facilitate lowering the ramp for below dock level service. In this way, the dock leveler is less likely to stall at the horizontal position as a result of the operator forgetting to manually retract the support legs. Another feature of the present invention is that the support legs may be positioned in a supporting position when a truck bed is engaged by the lip for above dock level service. This feature limits the descent of the ramp if a truck pulls away unexpectedly. Yet another feature of the present invention is that a means is provided for accomplishing the above function that is relatively simple in construction and does not require, for example, sensor arms or acceleration sensitive mechanisms.

In one aspect, a dock leveler is provided having a ramp, a support leg for supporting the ramp, and an extension lip that is movably connected to the ramp. The support leg is capable of movement relative to the ramp from a supporting position to a retracted position, and the lip is movable to an extended position. Movement of the lip toward the extended position results in movement of the support leg from the retracted position to a supporting position.

In another aspect, the present invention provides a method of operating a dock leveler having a ramp, a support leg and a lip. The method includes the steps of raising the ramp above a resting position, retracting the support leg to a retracted position, contacting the lip with a vehicle, extending the lip to an extended position, and moving the support leg from the retracted position to a supporting position during the extending step.

In yet another aspect, the present invention provides a method of operating a dock leveler having a ramp and a support leg, the method including the steps of raising the ramp above a resting position, retracting the support leg to a retracted position, lowering the ramp into substantial alignment with the vehicle bed, and moving the support leg from the retracted position to a supporting position during the aligning step.

BRIEF DESCRIPTION OF THE DRAWINGS

FIG. 4 is a side elevation section showing the lip in a partially extended position, the support leg in a retracted position, and the follower in an active position.

FIG. 5 is a side elevation showing the lip in a fully extended position and the support leg in a retracted position, but moving toward a supporting position.

FIG. 6 is a side elevation showing the lip in a fully extended position and the support leg in a supporting position.

FIG. 7 is a side elevation showing the lip falling to a pendent position, the support leg in a supporting position, and the follower in an inactive position.

DESCRIPTION OF THE ILLUSTRATED EMBODIMENT

Figure 1:
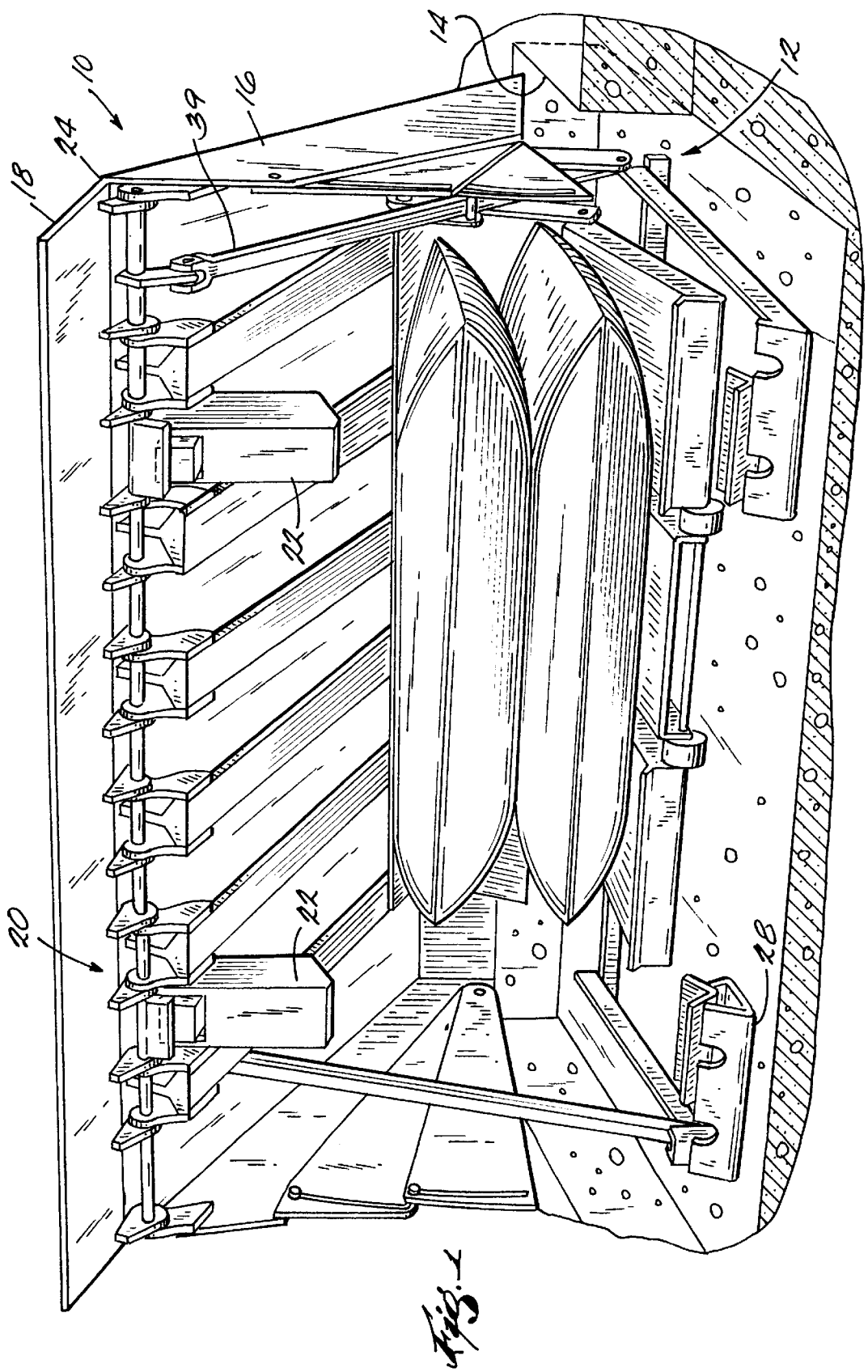
FIG. 1 is a perspective view of a dock leveler incorporating a support leg mechanism embodying the present invention.

FIG. 1 illustrates a dock leveler 10 embodying the present invention. The dock leveler 10 is adapted to bridge the gap between a loading dock and the bed of a truck or carrier parked in front of the loading dock. The dock leveler 10 includes a frame 12 or supporting structure mounted in the rear end of a pit 14, a ramp 16 pivoted to the frame 12, and a lip 18 pivotally attached to the ramp 16. The ramp 16 is movable between a generally horizontal position and upwardly inclined or downwardly declined positions. A dock leveler that may be suitable for application of the present invention is described in U.S. Pat. No. 5,481,774, issued Jan. 9, 1996 to Hodges et al.

Figure 2:
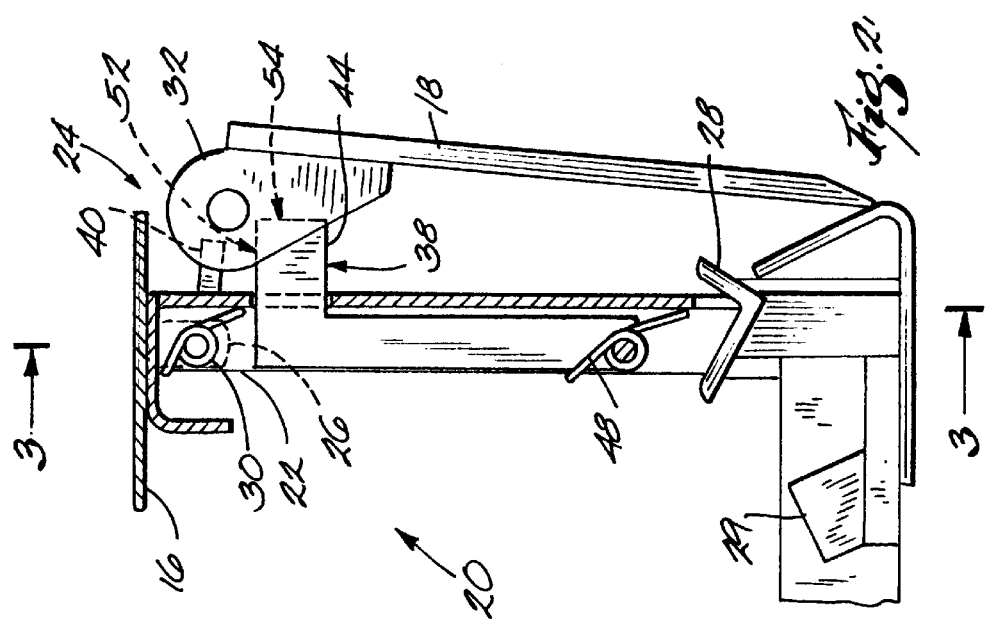
FIG. 2 is a side elevation section showing the support legs resting on the supporting subframe and the ramp in a substantially horizontal position.

The illustrated dock leveler 10 also includes a support leg mechanism 20 having two support legs 22. The support legs 22 are pivotally mounted to the ramp 16 near its front end 24 by means of leg brackets 26. As shown in FIGS. 2 through 7, the support legs 22 can be rotated between a supporting position (FIG. 2) and a retracted position (FIG. 4). When the support legs 22 are in a retracted position, they allow the ramp 16 to fall below a substantially horizontal position to a full below dock position. When the support legs 22 are in the supporting position of FIG. 2, they can support the ramp 16 in a substantially horizontal position (FIG. 2).

A supporting sub-frame 28 rests within the frame 12 of the dock leveler 10 and engages the support leg 22 in a supporting position. In the illustrated embodiment the supporting sub-frame 28 includes a V-shaped groove configured to receive the V-shaped end of the support leg 22. In this way, the support leg 22 is positioned on the supporting sub-frame 28.

Support legs 22 can be configured such that they can engage the supporting sub-frame 28 in a variety of positions (e.g., when the ramp 16 is slightly above or below a substantially horizontal position). The illustrated embodiment includes an abutment 29 that can engage the support leg 22 such that the ramp 16 is positioned in an intermediate below dock level position. In particular, the front end 24 of the ramp 16 can descend about four inches when the support leg 22 engages the abutment 29. This is approximately half of the maximum possible descent of the front end 24 of eight inches. A similar multiple engagement may also be accomplished, for example, by providing the support legs 22 with a series of notches that can engage the supporting sub-frame 28, as in U.S. Pat. No. 3,858,264 to Kuhns et al. As used herein, the support legs 22 are in a supporting position if they can support the ramp 16 above the full below dock position, and the support legs 22 are otherwise in a retracted position.

Figure 3:
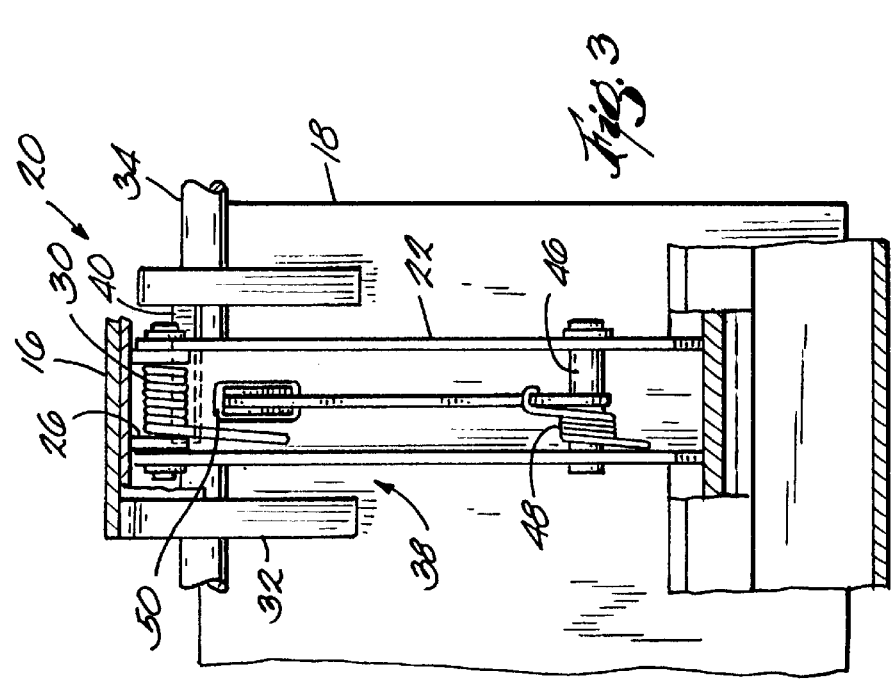
FIG. 3 is a rear elevation of one of the support legs taken along line 3—3 in FIG. 2.

The support legs 22 are biased toward a supporting position by a leg spring 30, shown in FIG. 3. As shown in FIG. 2, the leg spring 30 is mounted to the support leg 22 and to the bracket 26 to spring bias the support leg 22 to the supporting position. In the illustrated embodiment, the leg spring 30 is a torsion spring.

The illustrated extension lip 18 is pivotally mounted to the ramp 16 near the front end 24 of the ramp 16. As shown in FIGS. 2 and 3, the extension lip 18 is mounted onto a plurality of lip brackets 32 that rotate on a shaft 34 attached to the ramp 16. When the extension lip 18 is rotated outwardly and upwardly, the top surface of the extension lip 18 forms an extension of the surface of the ramp 16 (FIGS. 5 and 6). The fully extended lip 18 can be rested upon a vehicle bed 36 to form a continuous surface. Thus, the lip 18 provides a means for bringing the ramp 16 into substantial alignment with the vehicle bed 36. Engagement of the rear edge of the lip 18 with the front surface of the ramp 16 prevents the lip 18 from moving beyond the fully extended position where it is generally flush with the ramp 16. When not extended, the illustrated lip 18 hangs in a downwardly pendent position (FIG. 2). The pendent position of the lip 18 is an inoperative position because the lip 18 will not engage the vehicle bed 36.

As shown in FIG. 1, the lip 18 can be moved from the pendent position to an extended or operative position, and held such that the lip 18 may engage the vehicle bed 36, by a lip lifting mechanism 39. Various mechanical, hydraulic or pneumatic lip lifting mechanisms are well-known in the field. Lip lifting mechanisms may engage the lip 18 upon lifting of the ramp 16. With such a mechanism, the raising of the ramp 16 causes extension of the lip 18 which may then engage the vehicle bed 36. An example of such a mechanism is pictured in U.S. Pat. No. 3,858,264 to Kuhns et al. Alternately, extension of the lip 18 may be caused by lowering of the ramp 16 after the ramp 16 is raised to its highest position. An example of such a mechanism is pictured in U.S. Pat. No. 5,475,888 to Massey. By either method, the lip 18 is moved to an extended position in order to engage the vehicle bed 36 surface.

In the illustrated embodiment, the lip lifting mechanism 39 extends the lip 18 only partially, to a partially extended position between its pendent position and its fully extended position. The lip 18 then comes to its fully extended position as it rests upon the surface of the vehicle bed 36 and the weight of the ramp 16 extends the lip 18 to its maximum extension.

A cam and follower assembly 38 is operatively positioned between the lip 18 and the support leg 22. The illustrated cam and follower assembly 38 includes a cam in the form of a striker bar 40 mounted between two lip brackets 32, and a follower 44 mounted on the support leg 22. The striker bar 40 will engage the follower 44 as the lip 18 is moved to an extended position. Because the striker bar 40 has effectively a stepped cam profile, it can engage or release the follower 44 in a stepped fashion.

The illustrated follower 44 is movably mounted to the support leg 22. The follower 44 rotates on a follower shaft 46 within the support leg 22, and is biased to a forward active position by a torsion spring 48 connected between the follower 44 and to the support leg 22. As seen in FIGS. 2 and 3, the follower 44 extends through an opening 50 in the front surface of the support leg 22. The striker bar 40 can engage either the top surface 52 of the follower 44, during retraction of the support leg 22, or the front surface 54 of the follower 44, when the lip 18 falls to a pendent position. When the top surface 52 of the follower 44 is acted upon by the striker bar 40 in a downward direction (FIG. 4), the follower 44 will not move relative to the support leg 22 and the support leg 22 will be retracted. When the front surface 54 of the follower 44 is acted upon in a rearward direction, the follower 44 will move to an inactive position and allow the lip 18 to return to its resting pendent position without affecting the position of the support leg 22 (FIG. 7).

The present invention generally relates to the means by which alignment of the ramp 16 with the vehicle bed 36, and thereby movement of the lip 18, is related to movement of the support leg 22. As shown in FIGS. 2 through 7, a mechanism 20 causes movement of the support leg 22 in response to movement of the lip 18.

In operation of the illustrated embodiment, the ramp 16 begins from a substantially horizontal position (i.e., a dock level position) with the lip 18 in a pendent position before any loading occurs, as shown in FIG. 2. In this resting position, the support legs 22 are in a supporting position.

Next, as shown in FIG. 4, the ramp 16 is raised and lowered towards the vehicle bed 36 surface. Simultaneously, the lip 18 is moved to an extended position, here a partially extended position, by a lip lifting mechanism. As the lip 18 rotates to the partially extended position, the support leg 22 is retracted by engagement of the striker bar 40 with the top surface 52 of the follower 44 while the follower 44 is in the active position. Because the support leg 22 is retracted, the ramp 16 of the dock leveler 10 can be lowered to a below dock level position.

Next, as shown in FIG. 5, the lip 18 engages the vehicle bed 36 surface and is moved to an extended position, here a fully extended position, by the weight of the ramp 16. The contacting of the rear edge of the lip 18 with the front surface of the front end 24 of the ramp 16 limits the rotation of the lip 18 past its fully extended position. As the lip 18 rotates to its fully extended position, the striker bar 40 disengages the follower 44. When this happens, the support leg 22 may rotate forward to a supporting position. Because the support leg 22 is spring biased forwardly, it will automatically move to a supporting position. In this way, extension of the lip 18 from a partially extended position to a fully extended position causes movement of the support leg 22 from the retracted position to a supporting position at substantially the same time.

Finally, after the loading operations are completed the vehicle pulls away from the loading dock. Customarily, the dock leveler 10 will be returned to a resting position before the truck leaves the loading dock. This is accomplished by raising the ramp 16 sufficiently for the lip 18 to return to a pendant position, and then lowering the ramp 16 to a substantially horizontal position where the ramp 16 rests on the support legs 22. The extension lip 18 thus hangs between the dock leveler 10 and the vehicle bed 36 and allows the ramp to descend past the vehicle bed 36 to a resting position.

In the event that the vehicle pulls away unexpectedly, the lip 18 can fall to its pendent position without moving the support leg 22, as shown in FIG. 7. This is accomplished by actuation of the striker bar 40 with the front surface 54 of the movable follower 44, and rotation of the follower 44 to an inactive position. The ramp 16 can thereby descend to a resting position (e.g., a substantially horizontal position).

Other means of accomplishing the present invention may be possible, for example using chains or other linkages.

Various modes of carrying out the invention are contemplated as being within the scope of the following claims, particularly pointing out and distinctly claiming the subject matter which is regarded as the invention.

What is claimed is:

1. A dock leveler comprising:

a ramp;

an extension lip movably connected to said ramp and movable to an extended position;

a support leg for supporting said ramp and capable of movement relative to said ramp from a supporting position to a retracted position, the leg coupled to the ramp for pivotal movement toward the supporting position responsive to movement of the lip toward the extended position.

2. The dock leveler of claim 1, wherein movement of said lip from a partially extended position to a fully extended position results in movement of said support leg from a retracted position to a supporting position.

3. The dock leveler of claim 1, further comprising a cam and follower assembly operatively positioned between said lip and said support leg, said assembly including a cam and a follower.

4. The dock leveler of claim 3, wherein said cam is connected to said extension lip and said follower is connected to said support leg.

5. The dock leveler of claim 3, wherein said cam includes a cam profile having at least two surfaces such that movement of said lip toward the extended position results in contact of said follower on different surfaces of the cam.

6. The dock leveler of claim 3, wherein said follower is movably mounted to said support leg.

7. The dock leveler of claim 3, wherein said follower is movable between an active position and an inactive position.

8. The dock leveler of claim 7, wherein said follower is biased toward the active position.

9. The dock leveler of claim 1, wherein said lip is movable from an inoperative position to a partially extended position to a fully extended position, wherein said support leg is in a supporting position when said lip is in the inoperative position, wherein said support leg is in the retracted position when said lip is in the partially extended position, and wherein said support leg is in a supporting position when said lip is in the fully extended position.

10. A method of operating a dock leveler having a ramp, a support leg, and a lip, said method comprising the steps of:

raising the ramp above a resting position;

retracting the support leg from a supporting position to a retracted position;

extending the lip to an extended position; and moving the support leg from the retracted position to a supporting position during said extending step.

11. The method of claim 10, further comprising the steps of:

removing contact of the lip with a vehicle; and moving the lip to an inoperative position while the support leg remains in a supporting position.

12. The method of claim 10, further comprising the steps of:

removing contact of the lip with a vehicle;

returning the ramp to the resting position; and supporting the ramp on the support legs.

13. The method of claim 10, further comprising the step of:

extending the lip from a pendent position to a partially extended position during said retracting step.

14. The method of claim 13, wherein said retracting step includes the step of mechanically interconnecting the lip with the support leg such that said step of extending the lip from a pendent position results in said retracting step.

15. The method of claim 10, wherein said extending step includes the step of moving the lip from a partially extended position to a fully extended position during said moving step.

16. A method of operating a dock leveler having a ramp, a support leg, and a lip connected to the ramp said method comprising the steps of:

raising the ramp above a resting position;

retracting the support leg from a supporting position to a retracted position;

lowering the ramp;

aligning the ramp with the vehicle bed; and moving the support leg from the retracted position to a supporting position via movement of the lip during said aligning step.

* * * * *